United States Patent [19]

Marks

[11] Patent Number: 4,663,083

[45] Date of Patent: May 5, 1987

[54] ELECTRO-OPTICAL DIPOLE SUSPENSION WITH REFLECTIVE-ABSORPTIVE-TRANSMISSIVE CHARACTERISTICS

[76] Inventor: Alvin M. Marks, c/o ARDI, 359 R Main St., Athol, Mass. 01331

[21] Appl. No.: 596,428

[22] Filed: Apr. 3, 1984

Related U.S. Application Data

[63] Continuation-in-part of Ser. No. 222,377, Dec. 29, 1980, Pat. No. 4,442,019, which is a continuation-in-part of Ser. No. 909,944, May 26, 1978, abandoned.

[51] Int. Cl.[4] .......................... G02F 1/00; G02F 1/01; G03C 1/03; G02B 26/00
[52] U.S. Cl. .................................. 252/583; 350/355; 350/362; 252/600
[58] Field of Search ................ 252/583, 600; 350/267, 350/362, 355, 356; 340/787, 788

[56] References Cited

U.S. PATENT DOCUMENTS

| | | | |
|---|---|---|---|
| 1,955,923 | 4/1934 | Land | 350/362 |
| 1,963,496 | 6/1934 | Land | 252/583 X |
| 3,257,903 | 6/1966 | Marks | 252/583 X |
| 3,709,828 | 1/1973 | Marks | 252/583 |
| 3,773,684 | 11/1973 | Marks | 252/309 |
| 3,799,650 | 3/1974 | Saxe | 350/362 |
| 3,841,732 | 10/1974 | Marks | 350/362 |
| 3,900,417 | 8/1975 | Marks | 252/583 |
| 4,076,387 | 2/1978 | Haas | 350/362 |
| 4,442,019 | 4/1984 | Marks | 252/309 |

*Primary Examiner*—John F. Terapane
*Assistant Examiner*—Catherine S. Kilby

[57] ABSTRACT

An electro-optical dipolar suspension is described which is silvery-reflective at no voltage, which becomes black-opaque at small voltage, and transmittive at an increase of voltage. Such a dipole suspension is useful in displays because of greater contrast, decreased operating voltage, power, and cost.

10 Claims, 3 Drawing Figures

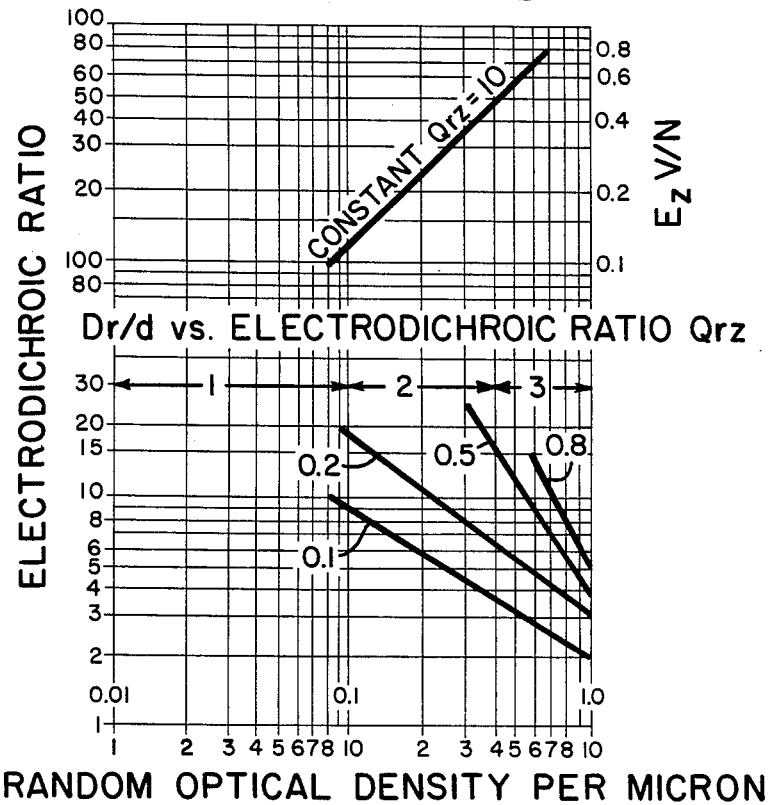
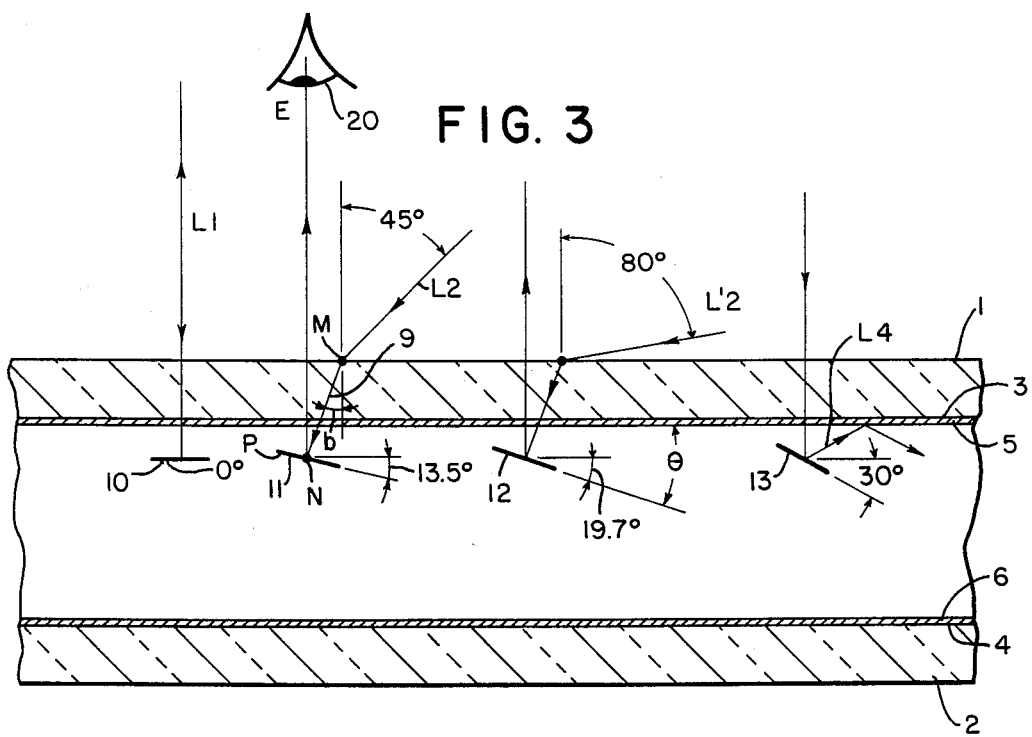

ELECTRO-OPTICAL DIPOLE SUSPENSION WITH REFLECTIVE-ABSORPTIVE-TRANSMISSIVE CHARACTERISTICS

RELATED PATENT APPLICATIONS AND PATENTS

This application is a continuation in part of patent application Ser. No. 222,377 filed Dec. 29, 1980 by the applicant and issued as U.S. Pat. No. 4,442,019 on Apr. 10, 1984. This invention, originally filed May 30, 1973 as Ser. No. 365,137, was inadvertently abandoned and refiled with new disclosure as Ser. No. 909,944 on May 26, 1978 and the present specification is a continuation in-part thereof. U.S. Pat. No. 4,442,019 is incorporated herein by reference; in which the Group I B claims 31, 32 and 33 relating to the diffuse reflective-absorptive-dipolar suspension; Group II claims 38(193) relating to a method for increasing the resistivity of a dipolar suspension; and Group III claims 37(198), 39(197) and 40(199) relating to an electro-optic panel are included herein. In the present case Group II claims are nonelected and reserved for further prosecution. Group I B and Group III claims are in this case.

This invention relates to a new and novel electro-optical dipole suspension, which has a silvery diffuse reflection at no voltage, and which becomes black when a small voltage is applied across a layer of the suspension, and substantially transparent when a larger voltage is applied.

BACKGROUND

The prior art may be understood from the references [1]. These related applications go into great technical detail and form a substantial background for the present application. A prior art absorption-reflection panels disclosed in my U.S. Pat. No. 3,841,732 col. 8 employed on electro-optic dipolar suspension which is normally absorptive at zero voltage, and transparent when full operating voltage is applied. Reflection has been obtained by employing a reflective backing, usually serving as the rear electrode. The present dipole suspension is new and novel because it is has different and advantageous properties.

In my U.S. Pat. No. 3,733,684 col. 33 Example D, a method of making a suspension of flat asymmetric particles is disclosed, which employs vapor deposition onto a thin membrane which is subsequently stretched. Also see my U.S. Pat. No. 3,813,265 col. 10, Example 1; I have discovered a new process which does not employ stretching, is simpler and less expensive, and which produces smaller suitable sizes; described herein after.

A process for increasing the resistivity of a dipole suspension utilizing centrifugation is more efficient and less expensive than the method using evaporation described in my U.S. Pat. No. 3,625,869 entitled "Method of Increasing the Resistivity of a Dipole Suspension".

BRIEF DESCRIPTION OF THE DRAWINGS

FIG. 1 depicts a plot of data for an Aluminum Flake Dipole Suspension on log-log graphs of ($D_r/d$) the Random Optical Density per micrometer of layer thickness vs. $Q_{rz}$ the Electrodichroic Ratio, Rise Time and Relax Time. A family of curves is shown at various constant values of Electric Field Intensity $E_z$. Also shown is ($D_r/d$) vs. $E_z$ for a constant value of $Q_{rz}$.

FIG. 3 shows a cross sectional view through an electrooptical cell of this invention, light rays incident on, and light rays reflected from reflective particles suspended in the composition at various angles to the surface of the layer, partial alignment of the particles at an angle greater than 40° to the surface resulting in total absorption of incident light rays because of the total internal reflection of the light within the cell.

DESCRIPTION OF THE INVENTION

Figure 2:
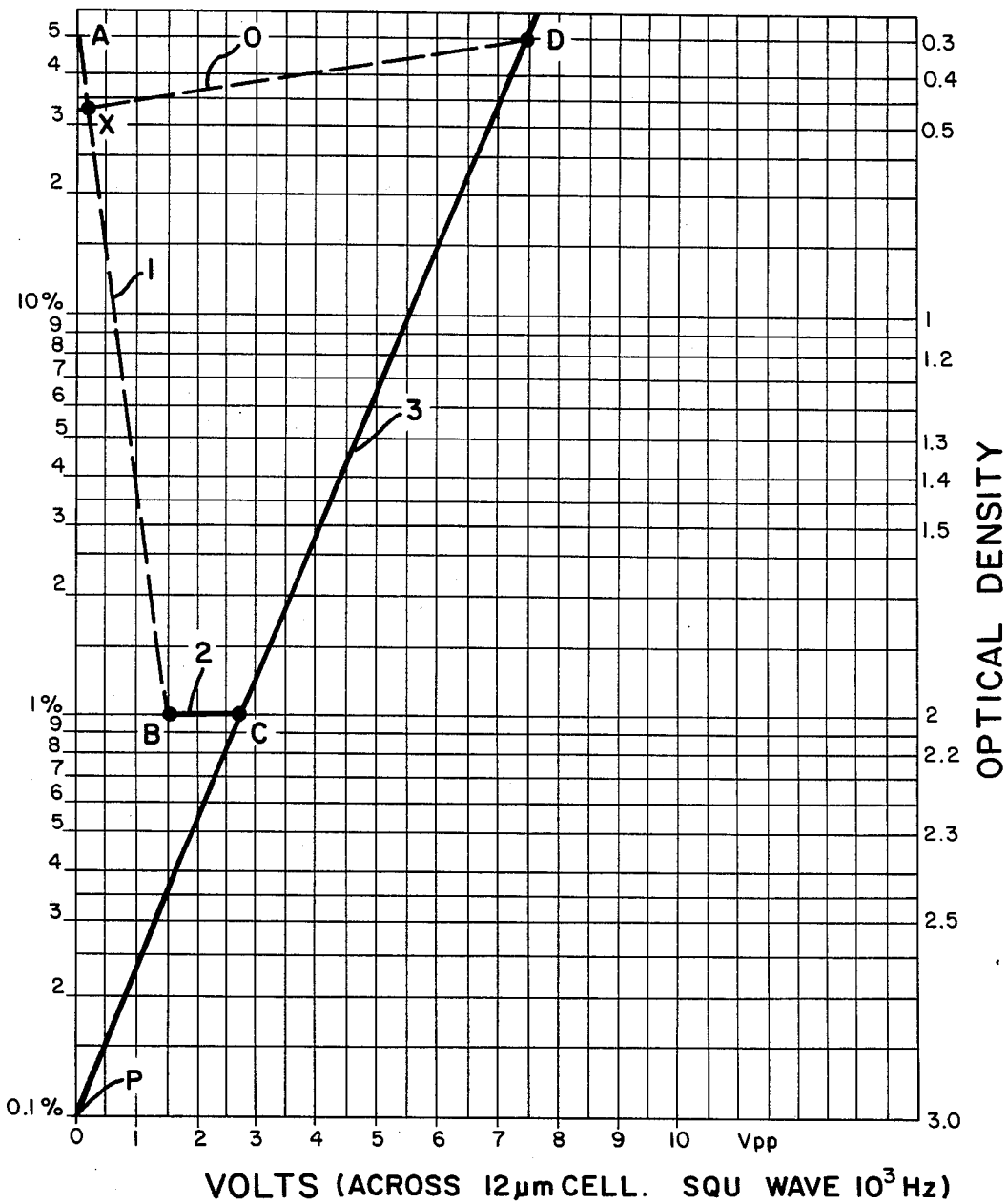
FIG. 2 shows a graph of the logs of Reflectance and Transmittance as ordinates vs. E the Electric Field Intensity and V the Voltage on a linear scale as abscissae, across a 12 $\mu$m thick cell containing a layer of a composition according to this invention.

The invention comprises an electro-optical dipolar suspension in an insulating surfactant fluid containing asymmetric thin flat particles of Aluminum, Silver or Chromium metal. In a thin layer this suspension has silvery color when no voltage is applied across the layer; becomes black opaque (absorptive) when a small voltage is applied; and substantially transparent when a larger voltage is applied. When no voltage is applied the particles are randomly oriented and silvery. When a small voltage is applied, the particles are partially oriented and black-absorptive. When a larger voltage is applied the particles are oriented in the direction of the electric field and may become electro-ordered, and substantially transparent. This electro-optical dipolar suspension was a new, novel and unexpected discovery which has many important applications and advantages. It may be used in electro-optical display cells instead of the presently used liquid crystal/polarized display cells because of its decreased power and voltage requirements, and because it has a silvery color with no voltage applied. Unlike prior dipolar suspensions, it has the unique characteristics of being reflective black or transparent, depending on the applied voltage. The asymmetric particles are flat, ribbons, flakes or discs, 50–200 Å thick and with long dimensions $=m(\lambda/2n)$ where $20>m>2$; $\lambda=$wavelength of light $0.4<\lambda<0.7$ micrometers, and n=index of refraction of the suspending medium. A concentrated suspension is employed as hereinafter defined.

Concentrated dipolar suspensions in an insulating fluid exhibit new and previously unsuspected properties, and in particular, extra ordinary electro-optical properties of great utility.

The extraordinary improvements resulting from the use of concentrated dipolar particle suspensions comprise more than an order of magnitude increase in the electrodichroic ratio, and several orders of magnitude in decreased rise time and decreased relaxation time. Moreover, there is a greatly increased stability against settling and coagulation, inactivated, or an repeated activation by an electric field. Other unique electrophysical effects include an electro-optic dipolar suspension which is normally silvery in color at zero voltage, black at small voltage, and substantially transparent at a greater voltage.

SUMMARY OF THE INVENTION

Accordingly, it is the primary object of the present invention to provide novel electrodichroic compositions of matter which is silvery in color at no voltage, black at a small voltage and transparent at an increased voltage.

Another object of this invention is to provide a substantially inorganic stable electrodichroic composition of matter exhibiting an electro-ordering effect which provides improved electro-optical properties.

A further object of this invention is to provide a new process for increasing the resistivity of a particle suspension in a fluid.

A still further object of this invention is to provide an electrooptical panel utilizing an electrodichroic composition of matter exhibiting the electro-ordering effect and which has a transmitter range from almost opaque to almost clear and is neutral in shade; being absorbent from the ultraviolet to the near infrared, and wherein the rise and relax times are in the low millisecond range.

It is yet another object of this invention to provide an electrooptic reflective display exhibiting high visible contrast and operative at low voltage and low power dissipation.

The mks system of units is consistently used where possible. The cgs system is used as noted. $10^{-6}$ m(meter) = 1 $\mu$m(micron) = $10^4$ Å (angstroms).

Most of the terminology employed herein was previously defined in my aforementioned U.S. Pat. No. 3,512,876 and new terminology is defined hereinafter.

A dilute suspension is defined as one in which the conductive dipole particles are so far apart that there is little or no interaction in an electric field. In this case the dipoles are said to be in the "far" electromagnetic field of each other.

A concentrated suspension is defined as one in which the conductive dipole particles are sufficiently close to interact in an electric field. The particles cannot approach closer than a minimum interparticle distance $\beta L$, where $\beta > 1$. At this distance the space $(\beta - 1) L$ between particles may be from several particle lengths to a fraction of the particle length L, and repulsion forces predominate, The smaller this distance, the greater the repulsion force. In this case the dipoles are said to be in the "near" electromagnetic field of each other.

The Maximum Concentration $\overline{C}$ and the Maximum Optical Density per Unit Suspension Layer Thickness $(\overline{D}_r/d)$ is approached as the distance between particles $\rightarrow 0$; that is $\beta \rightarrow 1$.

A dipole particle is defined as an asymmetric conductive particle having a major length of $L = m(\lambda/2n)$. Dipole particles are further defined by their size specified by various ranges of values for m:

| Subresonant Dipole | m < 1 |
| Resonant Dipole | m = 1 |
| Near-Resonant Dipole | ½ < m < 3/2; which includes "resonant". |
| Multiresonant Dipole | 10 > m > 1 |

Remanence is a greatly increased relax time of a particle alignment due to the retention of charges on conductive particles. Conductive particles suspended in an insulating fluid in an electric field may become charged temporarily or permanently by emitting electrons into the fluid.

A "particle string" is a group of conductive particles aligned parallel to the electric field lines and held in position by the electric field. The particles cannot approach each other closer than a minimum distance determined by an electrical repulsion force between the particles which increases as the space between the particles decreases. The repulsion force may be due to like charges on the particles and/or an electrical double layer surrounding each particle.

An Electro-ordered Array comprises spaced columns of particle strings, formed in a concentrated suspension by a strong electrical field. A well formed Electro-ordered Array is one in which all the particles are aligned into particle strings and no unattached particles remain between the particle strings.

The Electro-ordering Effect is the physical and electro-optical properties of an electro-ordered particle array in an electric field.

The electro-optical properties of dipolar particle suspensions are augmented by several orders of magnitude by the electro-ordering effect which occurs under the following conditions:

(1) Particle Size
  Submicron conductive asymmetric particles in the subresonant to near-resonant range 1000 Å to 3000 Å, and 50 to 200 Å thick, preferable almost uniform in size, with few or no larger particles, have a low millisecond relax time. Multiresonant particles form Electro-ordered Arrays, are remanent, and have a 1 to $10^4$ second relax time.
(2) Particle Suspension Concentration
  0.5 to 15 weight %.
(3) Random Optical Density
  0.05 to 1.5/$\mu$m
(4) Layer Thickness
  2 to 100 $\mu$m
(5) Electric Field Intensity
  0.1 to 20 volts peak-to-peak/$\mu$m, depending on the particle conductivity and shape factor.
(6) A fluid Medium of Preferably:
  6.1 Resistivity $\geq 10^{12}$ ohm-cm.
  6.2 Small Dielectric Constant $\leq 2.30$
  6.3 Large Breakdown Electric Field $> 20$v/$\mu$m
  6.4 Large dispersibility for the particle
  6.5 Large Density $\geq 1.60$ gms/cm$^3$
  6.6 Low viscosity $< 10$ centipoise
  6.7 A freezing point of $< -40°$ C. to a boiling point of $\sim 200°$ C.

See U.S. Pat. No. 4,432,019, the drawings of which are incorporated herein by reference.

Experimental observations on dilute and on concentrated dipole suspensions are described hereinafter to illustrate the substantially different, new and advantageous properties of the latter.

Dilute metal suspensions, such as aluminum or chromium, which contain resonant or subresonant dipole flakes about 2000 Å long and 50 to 200 Å in thickness, are stable when inactivated and do not coagulate or settle; however, upon activation, coagulation may occur. The Electrodichroic Ratio is small, only about 1.5 Dilute suspensions containing larger multiresonant flakes, from 0.3 to 1.5 $\mu$m long and 70 Å thick, had a useful Electrodichroic Ratio of 5 to 10 or more; however, these larger flakes settled, and suspensions were not clear.

From these experiments with dilute suspensions of metal flake particles, there appeared to be a hopeless dilemma, that is, multiresonant flake particles having a large Electrodichroic Ratio of 5 to 10 always settled while resonant and subresonant flake particles which remained suspended had too small an Electrodichroic Ratio to be useful (about 1.5).

An aluminum flake suspension stored in a stoppered bottle for 2 years had settled and although the particles did not settle completely to a solid, there remained on the bottom of the bottle, a dark viscous fluid-mass which was similar to a dark, heavy oil with clear fluid on top. This dark oily fluid which comprised an aluminum flake concentrated dipole suspension was placed in a cell having a layer thickness $d=25$ μm between transparent electrodes on glass. It formed a neutral dark blue fluid layer with an Optical Density $D_r \approx 3$, $(D_r/d)=0.12$ Optical Density per μm and had an Electrodichroic Ratio of about 5. It was repeatedly reversible and permanently stable.

A new and improved method of increasing the resitivity of a dipole suspension follows:

A dilute particle suspension is centrifuged at rpm-1; the top fluid suspension from rpm-1 is then centrifuged again at a somewhat greater speed, rpm-2. Particles which are sedimented at rpm-2 form a concentrated dark "oil" or "mud" at the bottom of the centrifuge container which contains particles from the "slot" between rpm-2 and rpm-1. After decanting the top fluid, the sediment comprises a concentrated suspension which is a dark fluid capable of forming an Electro-ordered Array in an electric field. The particles employed may be rods or discs, comprising any metal such as aluminum, chromium, etc.; a semi-metal such as graphite flake crystals; a semi-conductive asymmetric crystal compound such as molybdenum disulfide; or, a dichroic blade shaped crystal such as Herapathite. At greater than 5000 g's, a substantial fraction of the particles are submicron and have a size less than 3000 Å. The size depends upon particle density, size and shape, centrifugal g; time; fluid density and viscosity.

To increase the resistivity of the concentrated suspension, it is diluted by a factor of 100 to 1000 with a fluid which has a reistivity of at least $10^{12}$ ohm-cm. Traces of any conductive fluid such as water, alcohol, etc., will remain in the suspending fluid after centrifuging and necessitates sedimenting the particles again. The resistivity of the sediment increases each time by about an order or magnitude until it approximates that of the high resistivity fluid. For example, starting with a concentrated particle suspension having resistivity of about $10^7$ ohm-cm. and repeating this process about 5 times with a fluid having a resistivity $>10^{12}$ ohm-cm., a concentrated particle suspension having a resistivity of about $10^{12}$ ohm-cm. is obtained.

Aluminum vapor coated on a polystyrene sheet of 30% transparency formed aluminum particles having a thickness of about 80 Å. Various size ranges may be prepared by dissolving the sheet in a solvent, and breaking up these particles by fluid shear forces in a "homogenizer" and separating them into rpm slots as above described. Various shapes of particles may be obtained depending on the vapor deposition conditions. The vapor coating appears to be crystalline as it often breaks into elongated blades with well defined angular ends. Under other conditions of vapor deposition, submicron discs may be obtained.

These particles may be suspended in an ester fluid such as isobutyl acetate, with a trace of nitrocellulose. When a D.C. field is applied to this suspension between bare electrodes, the particles are negatively charged. When other esters such as pentyl acetate or octyl acetate are used, the charge on the particles becomes less negative or neutral. When the proportion of nitrocellulose is increased to about 1% the particle migration ceases and particles do not coat the electrodes, suggesting that the net particle charge is zero.

The remanence appears to be due to different numbers of multiple charges which are retained on particles. As the particles are aligned, the particle charges are displaced to balance the field between adjacent particles of unequal charge. Permanent electric dipoles are thus formed on the aligned particles, which may remain permanently aligned in the fluid until randomized by an external force, or more slowly by electrical leakage and Brownian motion.

This aluminum dipole suspension operates in the transmission mode at about 5 volts peak-to-peak sine or square wave at 30 to $10^4$ Hz across a 12 micron layer; that is, with an electric field intensity of only 0.42 volts per micron to produce an electrodichroic ratio of 10; or 8 volts at 0.67 volts per micron to produce an electrodichroic ratio of 15. This behavior is best explained by the "Electro-ordering Effect". When the aluminum particles are far apart, there is little interaction between them, but as a particle suspension becomes more concentrated, particle interaction begins and electro-ordering of the particles occurs.

A concentrated near-resonant to multiresonant aluminum suspension has a diffuse silvery reflectance in the random state, and is black when the particles are partially aligned, for example, with about 1.5 volts peak-to-peak A.C. applied across a 12 micron layer in which $D_r/d$ exceeds 0.2. These unsuspected results are important for low power displays, since the reactive and the resistive powers are each proportional to $V^2$. Compared to the power used by electro-optical fluid devices, taken as 100%, operating at 30 volts peak-to-peak; the power used by this suspension in the reflective/black mode, is only $2\frac{1}{2}\%$. A further advantage is that the low voltage simplifies the electronic circuits.

The total power consumption is less than 1 μw/cm$^2$. Since the rise time is about $10^{-1}$ seconds, the total average power used for remanent alignment once after each 1 erasure per minute is about $10^{-9}$ watts/cm$^2$. Since the random state is diffuse reflective and the "on" state is black, the display numerals appear as black on a diffuse silvery background. Such remanent suspensions are of particular interest for use in small battery operated display devices such as wrist watches which must operate over long periods of time without requiring a battery refill. By comparison, a dilute suspension where $D_r/d<<0.2$ appears dark by reflection in the random state. In a dilute suspension, the reflective particles are so far apart that the light enters some depth into the suspension layer before it is randomly reflected by the particles; and such light may be internally reflected several times by other particles and so become lost or absorbed within the layer. However, in a concentrated suspension, the light enters a short distance into the layer, encounters a particle, and is reflected back out of the layer, usually without encountering another particle. The concentration is limited with large particles. For best operating characteristics with a concentrated suspension of multiresonant reflective remanent particles there is an optimum concentration range of about 0.2 to 0.4 Optical Density/μm.

For a metal dipole suspension in a suspending fluid having an index of refraction of about 1.5, the reflected or scattered component rapidly decreases for particle diameters less than $\lambda/3=1880$ Å. Below $\lambda/6=1000$ Å there is very little reflectivity, and at $\lambda/10=500$ Å, the reflectivity is substantially zero.

The absorptivity for transmitted light increases to $\lambda/4=1500$ Å, and then decreases almost linearly down to zero dimension. At λ/10, the absorptivity has decreased only about ⅓ from peak, while the reflectivity is substantially zero. Thus, as the particle diameter decreases from 2000 Å down to 500 Å there is a rapid change from diffuse reflective to black.

Suspensions may comprise various metals such as aluminum, silver, chromium, etc., having a thickness of 50 to 150 Å and a diameter in the near-resonant to multiresonant range. The smaller particles relax more rapidly, the larger particles more slowly.

A remanent suspension may be useful for memory type displays, wherein information is written into the display, and is retained by the display for a predetermined time, unless erased as required in a time less than the relax time. Such an erasure may be accomplished electrically in which the particles are disaligned and randomized by a suitable electrode structure for switching the aligning field from a Z to X or Y direction; that is from normal to parallel to the plane of the display, as described in my U.S. Pat. No. 3,527,525. Such erasure may alternatively be accomplished for the entire display be a shear force introduced into the liquid to rapidly disalign and randomize the aligned dipoles; for example as shown in my U.S. Pat. No. 3,257,903 wherein the facing plates between which the dipole suspension is placed are displaced slightly relative to one another. Alternatively, the plates may be stationary and a shear force introduced into the fluid between the plates by causing the fluid to move or oscillate parallel to the surface of the display. Many methods may be employed to introduce a motion into the liquid. For example, the liquid motion may be actuated by a piezoelectric crystal in contact with it; or a flexible membrane to which a pressure can be externally applied. Another method to cause fluid motion is by an electrocapillary junction.

The same aluminum particles which are remanent, that is with $\tau_r > 1$ second, show a relax time which is rapid, that is $\tau_r << 1$ second, for example 100 milliseconds by a change in chemical environment. The rapid relax time is produced by controlling the electric charge on the particles from strongly positive for remanent suspensions to slightly negative for suspensions which relax most rapidly. These conditions are peculiar to multiresonant particles where m is $>> 1$. When $m << 1$, the particles retain zero or a few charges and do not exhibit remanence, and the relax time is very rapid, that is <100 ms.

A suspension of multiresonant aluminum particles was suspended in various proportions 0 to 100% of isopentyl isobutyrate and 100% to 0% of pentyl acetate containing about 0.1% nitrocellulose. The fluid components were varied for values of $D_r/d = 0.2$ and 0.4 respectively. The relax time of the suspension and the charge on the particles were measured as the percentage of isopentyl isobutyrate was increased from 0 to 100%. For an isopentyl isobutyrate/pentyl acetate ratio (IPB/PA) 100/0, the relaxation time was 300 ms and the charge was strongly negative. As the IPB/PA ratio decreased to 50/50, the charge became less negative and the relaxation time decreased to a minimum of 150 ms. At decreased ratios of IPB/PA from 50/50 to 0/100, the charge approached zero, and the relaxation time increased again to 300 ms.

Corresponding figures for $D_r/d$ 0.2 were lower starting at 250 ms for 100/0 decreasing to 100 ms at 50/50 and increasing again to about 250 ms at 0/100.

With these multiresonant aluminum suspensions, the optimum $D_r/d$ is about 0.2; at greater concentrations, for example, 0.4, the relax time increases, since the particles become so close as to impede each others motion. At lower concentrations, for example for $(D_r/d) < 0.1$ the suspension may coagulate. The relaxation time is increased with particles having an increased negative charge. The minimum relaxation time occurs when the particles are slightly negative.

With certain fluid esters, such as isobutyl acetate or isopentyl isobutyrate containing a proportion of nitrocellulose the charge on suspended aluminum particles is negative; but, with higher normal esters such as pentyl acetate or octyl acetate, the charge on the particles is neutral.

A multiresonant aluminum particle suspension in an ester such as pentyl acetate, has a positive charge and deposits quickly onto a glass surface. From 0.05 to 5% of a polymer such as nitrocellulose retards or eliminates this deposition. Aluminum in isobutyl acetate, or isopentyl isobutyrate and nitrocellulose ≈1% with about 3% of a plasticizer (such as 3% Flexol 13—13, manufactured by Union Carbide Co.) is negatively charged and does not deposit onto glass. Aluminum, with a positive charge in perchloroethylene and polystyrene 0.1%, deposits quickly onto glass. Increasing the polystyrene to about 3% prevents or slows down the deposit. The presence of a 1-halogen alkyl where the alkyl has 6 to 12 carbon atoms, and the halogen is chlorine, bromine or iodine produces an excellent aluminum suspension. The aluminum has a positive charge, and is surrounded by the 1-halogen alkyl fluid as a "double charge layer". The halogen alkyls are examples of electron-acceptor molecules, which attract an electron from the conductive particles.

Conductive particles having positive charges may deposit onto glass or transparent conductive oxide surfaces which have a negative charge.

Conductive particles such as graphite or a metal such as aluminum may be given a negative charge as above described, by a suitable polymer or fluid, and will then not deposit onto these negatively charged surfaces.

For a very rapid relaxation time, $\tau_r << 100$ ms the dipole particle size must be in the near-resonant to subresonant region. These suspensions are black in the random state and transparent when aligned. For example, a subresonant to near-resonant suspension of aluminum, chromium, etc., has a rapid relaxation time of the order of 1 to $10^2$ ms, depending on size, shape and charge of the particle, and the viscosity and composition of the suspending fluid.

Region 1—Dilute Concentration

In this region $(D_r/d)$ varies up to 0.10 Random Optical Density/μm, and the concentration is said to be "dilute" These suspensions may be stable in a zero electric field, but when a strong electric field is applied, the particles often irreversibly coagulate. Remanent charges on the particles produce an electrical attraction force between particles which cause aggregates to form. Since coagulation is a function of electrical field intensity and time, the electrodichroic ratio, rise and relax times measured are erratic. In general, particle suspension in this region are not useful in low viscosity fluids. With suspending fluids of greater viscosity and with added surfactants and polymers these dilute suspensions may be stabilized; however, such suspensions have slow response.

Region 2—Medium Concentration

Medium Concentration Region 2 may also be termed the "transition" region because the electro-optical properties and stability rapidly change with $D_r/d$. In the particular graphite suspension, the medium concentration range is from $D_rd=0.10$ to 0.40 Random Optical Density/$\mu$m. In this range, the rise time and relax rapidly decrease by about 2 orders of magnitude. As $D_r/d$ increases, the Electro-ordered Arrays are more readily formed in a stable configuration.

The more concentrated portion of this region may be useful for many applications, since electrodichroic ratios to 40 may be achieved with an electric field intensity of about 8v/$\mu$m. For example, for d=12 to 25 $\mu$m with a Random Optical Density of 4, $D_rd=0.16$ to 0.35. An electrodichoric Ratio of 40 is obtained with about 10v/$\mu$m. This is a change from substantially opaque $D_r=4$, $T_r=0.01\%$, to substantially transparent $D_z=0.1$, $T_z=80\%$; or a Transmission Ratio of $(T_z/T_r)=8000$.

Region 3—High Concentration

In this region of high concentration, where $D_r/d$ varies from about 0.4 to 1.3 Optical Density/$\mu$m, the Electro-ordered Array is most readily formed and dispersed, the electro-optical properties are high, the suspension is permanently stable, and reversible over a substantially infinite number of cycles. The rise and relax time in this region are approximately constant. The rise time decreases from about 40 ms to 15 as the electric field intensity is increased from 2 to 10 v/$\mu$m. At a given electric field intensity, the rise time is almost constant over this range. In a similar manner, the relax time decreases from about 40 to 17 ms, as the electric field intensity is decreased from 10 to 2 v/$\mu$m. However, as $D_r/d$ increases from 0.5 to 1.3, the relaxation time becomes substantially constant at about 18 ms, independent of the previously applied electric field intensity.

Region 4—Extreme Concentration

In this region, where $(D_r/d) \geq 1.3$, the concentration is so great that the particles are too crowded to permit a well formed Electro-ordered Array to occur, and there are many particles between Electro-ordered Arrays. In this region, an increased concentration is characterized by a decrease in the Electrodichroic Ratio at constant electric field intensity, electrical shorting across the layer may occur and stable operation may not be attained.

Optimum Concentration

The optimum operating region depends on the engineering objective: preferably however, chosen from regions 2 and 3 where the suspension is stable and reversible; avoiding region 1 which is unstable, and region 4 which is dysfunctional because of particle overcrowding and shorting. An exception occurs, if a more viscous fluid is employed to stabilize region 1, but then rise and relax times are slow. In Region 2 from $D_r/d'0.10$ to 0.40, the $Q_{rz}$ is a maximum of 40 and $E_z$ varies from about 4 to 7.5 v/$\mu$m. For the smallest operating voltage and the fastest response, region 3 from $D_r/d=0.4$ to about 1 may be employed.

The concentrations defining the regions 1, 2, 3 and 4 may vary, depending upon the particle size, distribution and shape; fluid composition and the nature of the particle; particle charging; and the electrical double layers. The thickness of the electrical double layer depends on the chemical composition of the particle and the fluid in which it is suspended.

With uniform particle dimensions, in certain cases, the Electroordered Arrays are so regularly spaced as to produce color diffraction effects when light is passed through the layer at an angle to the normal. First order diffraction colors are seen as this angle is varied. In certain suspensions, this occurs when the maximum electric field is applied of about 14 v/$\mu$m.

TABLE II

| | VALUES OF PHYSICAL CONSTANTS SOLIDS | | | |
|---|---|---|---|---|
| Material | Density $\delta \times 10^3$ Kg/m$^3$ | Dielectric Constant $K_e$ | *** K OD/$\mu$ % | Resistivity $\rho$ ohm-cm. |
| Aluminum | 2.70 | $\infty$ | | 2.65 $\times 10^{-6}$ |
| Chromium | 7.13 | $\infty$ | | 12.9 $\times 10^{-6}$ |

***Random Optical Density per micron layer thickness per % Concentration

TABLE III

| | VALUES OF PHYSICAL CONSTANTS FLUIDS | | | | | | |
|---|---|---|---|---|---|---|---|
| Material | Density $\delta \times 10^3$ Kg/m$^3$ | Dielectric Constant $K_e$ | Electric Breakdown $E_b$ v/m | Resistivity $\rho$ ohm-cm. | Pour Point °C. | Boiling Point °C. | Viscosity $\approx$20-25° C. cp |
| n-Decane | 0.73 | 1.99 | $\approx 12 \times 10^6$ | $10^{12}$ | −29.7 | 174 | 0.775 |
| n-Nonane | | | | | −53.6 | 150.8 | 0.711 |
| Iso-Nonane | | | | | −80.4 | 143.6 | |
| Hydrocarbon Oils | | 2.2 | $18 \times 10^6$ | $10^{15}$ | | | |
| Perchloroethylene | 1.630 | 2.3 | $\approx 20 \times 10^6$ | $>10^{12}$ | −22 | 121 | 0.880 |
| Butyl Acetate | 0.883 | 5.0 | $\approx 6 \times 10^6$ | | −73.5 | 126.6 | 0.74 |
| Isobutyl Acetate | 0.870 | — | | | −98.0 | 116.4 | |
| Di-2-Ethyl Hexyl Adipate (DOA) | 0.925 | — | | $>10^{12}$ | −60.0 | $210^{5mm}$ | 13.0 |
| n Octyl n Decyl Phthalate (NODP) | 0.972 | | | $>10^{12}$ | −45.0 | $252^{5mm}$ | 45.0 |

Regional Concentration Effects

In Dilute Suspension Region No. 1 the particles are so far apart that repulsion force fields between the particles are weaker than the random forces on the particles due to Brownian Motion, and Electroordered Arrays which may form are unstable. The repulsion force fields cannot stabilize columns of particle strings which are too far apart. Under these conditions, on applying a strong electric field intensity, and then letting the electric field decrease to zero, the particles may coagulate by forming irreversible local aggregates.

In the Medium Concentration Region No. 2 the rise and relaxation times greatly decrease as the concentration increases because a transition occurs where $\gamma<\alpha<\beta$, and becomes smaller.

Well formed Electro-ordered Arrays, comprising equidistant particles, appear to occur in the High Concentration Region No. 3. In well-formed Electro-ordered Arrays where $\alpha=\beta=\gamma$ the repulsion fields around each particle stabilize the positions of the particles and the columns of particle strings by a mutual and equal repulsion between all particles.

In the Extreme Concentration Region No. 4, an increase in voltage cannot be sustained as the particles are so near to each other, that shorting occurs, and the maximum particle concentration for useful operation is exceeded.

In the random state aluminum dipole fluids have a blue color, particularly in a thin layer where the optical Density is less than 3. It is advantageous to employ an absorber for ultraviolet and blue light to 450 nm, such as described in my U.S. Pat. No. 3,298,959.

Remanence

These dipolar suspensions have rapid rise times and slow relaxation times. they are useful for displays. they save energy because the voltage need of on for only a small portion of the duty cycle.

New and Improved Compositions

New electro-optical dipole compositions exhibiting the electroordering effect were discovered. Surfactants such as lecithin were found useful for the suspension of dipolar particle compositions; compositions using surfactant plasticizers and surfactant polymers were also useful for this purpose.

Silvery-Dark Reflectance

A dipole suspension having large flakes $L>>\lambda/2n$ was discovered which has diffuse silvery reflectivity in the random state and becomes black on *partial alignment with only 20% of the voltage required for full alignment*. This discovery is based upon the stability of a high concentration of large size charged particles. Because only relatively small voltages ae used, an electro-ordered array does not form. This silvery-dark reflective characteristic dipole suspension is the reverse of the dark-transparent characteristic of the other dipole suspensions heretofore described. The electric power required to actuate the display is about 25 times smaller which means longer life for battery operated displays. These properties are very useful for displays.

The data presented herein are illustrative, but do not limit the broad scope of the invention.

REFERENCES:
Patents issued on Alvin M. Marks
1. U.S. Pat. No. 3,257,903, issued June 28, 1966 entitled ELECTRICALLY RESPONSIVE LIGHT CONTROLLING DEVICE EMPLOYING SUSPENDED DIPOLE PARTICLES AND SHEAR FORCES.
2. U.S. Pat. No. 3,341,274, issued Sept. 12, 1967, entitled ELECTRICALLY RESPONSIVE LIGHT CONTROLLING DEVICE EMPLOYING SUSPENDED DIPOLE PARTICLES IN A PLASTIC FILM.
3. U.S. Pat. No. 3,512,876, issued May 19, 1970, entitled DIPOLAR ELECTRO-OPTIC STRUCTURE.
4. U.S. Pat. No. 3,527,525, issued Sept. 8, 1970, entitled FORCED CLOSURE DIPOLAR ELECTRO-OPTIC SHUTTER AND METHOD.
5. U.S. Pat. No. 3,625,869 issued Dec. 20, 1971, entitled METHOD OF INCREASING THE RESISTIVITY OF A DIPOLE SUSPENSION.
6. U.S. Pat. No. 3,653,741, issued Apr. 4, 1972, entitled ELECTRO-OPTICAL DIPOLAR MATERIAL.
7. U.S. Pat. No. 3,709,828, issued Jan. 9, 1973, entitled METHOD FOR FORMING SUBMICRON DIPOLE PARTICLES.
8. U.S. Pat. No. 3,773,684, issued Nov. 20, 1973, entitled DIPOLAR ELECTRO-OPTIC COMPOSITIONS AND METHOD OF PREPARATION.
9. U.S. Pat. No. 3,813,265, issued May 28, 1974, entitled ELECTRO-OPTICAL DIPOLAR MATERIAL.
10. U.S. Pat. No. 3,841,732, issued Oct. 5, 1974, entitled DIPOLAR ELECTRO-OPTIC STRUCTURES AND METHOD.
11. U.S. Pat. No. 28,211, issued Oct. 22, 1974, entitled FORCED CLOSURE DIPOLAR ELECTRO-OPTIC SHUTTER AND METHOD.
12. U.S. Pat. No. 3,848,964, issued Nov. 19, 1974, entitled FORCED CLOSURE DIPOLAR ELECTRO-OPTIC SHUTTER AND METHOD.
13. U.S. Pat. No. 3,900,417, issued Aug. 19, 1975, entitled METHOD AND APPARATUS FOR FORMING SUBMICRON DIPOLE PARTICLES.
14. U.S. Pat. No. 4,442,019 issued Apr. 10, 1984, entitled ELECTRO-ORDERED DIPOLE SUSPENSION.

What I claim is new is:

1. A composition of matter comprising a surfactant fluid, a suspension of assymetric conducting reflective particles in said fluid, said particles having a length L, wherein $1<L<5$ μm, an electric charge on each said particle, said charge having the same sign and comprising at least one electron charge per particle, said charges producing a repulsion force between the said particles balancing the settling force on said particles due to gravity, said particles in said fluid being thereby constituting a stable nonsettling suspension, the concentration of said suspension being characterized by an interparticle distance $\lambda L$, wherein $1<\lambda<3$, said suspension being further characterized by the electrooptical properties of a volume of said fluid suspension in a layer having parallel surfaces, said surfaces being separated by a thickness $3<d<30$ Ξm, said layer having an electric field E normal to said surfaces, said composition in said layer having a silvery-reflectance when said electric field is 0, said composition in said layer becoming black-absorptive as the said electric field is increased from 0 to $E_1$, said composition in said layer remaining black-absorptive when said electric field is between $E_1$ and $E_2$, and said composition in said layer becoming transparent when said electric field is increased from $E_2$ to $E_3$.

2. A composition of matter according to claim 1, in which said particles in said layer are aligned and electroordered by an electric field $E_3$, whereby its transmittance is a maximum.

3. A composition of matter according to claim 1 in which said electric field alternates at $30-10^4$ Hz, and in which said silvery-reflectance changes to black-absorbing-opaque as the said electric field is increased from 0 to $E_1$ and to $E_2$, where $E_1$ is about 0.13 v/μm and $E_2$ is about 0.23 v/μm.

4. A composition of matter according to claim 3, in which a said electric field from $E_2$ to $E_3$ electroorders said particles in strings with the long dimensions of said particles normal to said surface, the transmittance of the said layer becoming a maximum when said particles are electroordered, the electric field $E_2$ being about 0.23 v/μm and the electric field $E_3$ being about 0.63 v/μm, whereby the transmittance of said layer increases from about 0.1% to 1% to a maximum of about 80%.

5. A composition of matter according to claim 1 in which said particles are metal flakes 50 to 200 Å thick and their greatest length $L=m(\lambda/2n)$ where $20>m>2$ where n=index of refraction of the fluid, and λ=wavelength of light in μm.

6. A composition of matter according to claim 5 in which the said flakes are chosen from the class Aluminum, Silver and Chromium.

7. A composition of matter according to claim 1 in which said layer has a silvery-reflectance when at least a portion of said particles are aligned with their surfaces parallel to 40° to the surface of said layer, the said layer being black-absorptive-opaque when the surfaces of all said particles are aligned at least 40° to the surface of said layer, said layer having maximum transmittance when said particles are electroordered in strings with the long dimensions of said particles normal to the surface of the said layer.

8. A composition of matter according to claim 1, in which said layer is substantially transparent when said particles are partially aligned by an electric field of at least 0.5 v/μm peak to peak, said electric field being a square wave having a frequency 30 to $10^4$ Hz.

9. A composition of matter according to claim 1, in which said layer has maximum transmittance when said particles are aligned and electroordered by an electric field of at least 0.6 v/μm peak to peak, said electric field being a square wave with a frequency 30 to $10^4$ Hz.

10. A composition of matter according to claim 1, in which the Optical Density per μm thickness of said layer is in the range: $0.5>(D_r/d)>0.1$, the thickness of said layer being about 12 μm, the voltage across said layer is in the range: $1.5<V<2.8$ Volts peak to peak for the black-opaque-absorptive State, and the voltage is in the range: $2.8<V<7.5$ Volts peak to peak for the Transmissive State, said Voltage being a square wave with a frequency 30 to $10^4$ Hz.

* * * * *